(12) United States Patent
Grey et al.

(10) Patent No.: US 10,359,635 B2
(45) Date of Patent: Jul. 23, 2019

(54) EXIT PUPIL EXPANDING DIFFRACTIVE OPTICAL WAVEGUIDING DEVICE

(71) Applicant: Wave Optics Ltd, Maidenhead Berkshire (GB)

(72) Inventors: David Grey, Maidenhead (GB); Sumanta Talukdar, Maidenhead (GB)

(73) Assignee: Wave Optics Ltd., Maidenhead Berkshire (GB)

( * ) Notice: Subject to any disclaimer, the term of this patent is extended or adjusted under 35 U.S.C. 154(b) by 0 days.

(21) Appl. No.: 16/103,113

(22) Filed: Aug. 14, 2018

(65) Prior Publication Data

US 2019/0004321 A1   Jan. 3, 2019

Related U.S. Application Data

(63) Continuation of application No. 15/329,557, filed as application No. PCT/GB2015/052181 on Jul. 28, 2015, now Pat. No. 10,114,220.

(Continued)

(30) Foreign Application Priority Data

Feb. 9, 2015   (GB) .................................. 1502098.5

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0016* (2013.01); *G02B 6/0038* (2013.01);
(Continued)

(58) Field of Classification Search
CPC ............ G02B 27/0172; G02B 27/0081; G02B 27/4272; G02B 6/0016; G02B 6/0038
See application file for complete search history.

(56) References Cited

U.S. PATENT DOCUMENTS 8,548,290 B2 * 10/2013 Travers .............. G02B 27/0081
359/34
10,114,220 B2 * 10/2018 Grey .................. G02B 27/0081
(Continued)

FOREIGN PATENT DOCUMENTS

EP        2196729 A1    6/2010
WO    2006132614 A1    12/2006
(Continued)

OTHER PUBLICATIONS

International Search Report and Written Opinion dated Oct. 12, 2015 for international application PCT/GB2015/052181.
(Continued)

*Primary Examiner* — Ryan A Lepisto
(74) *Attorney, Agent, or Firm* — Stoel Rives LLP; R. Whitney Johnson

(57) ABSTRACT

An optical device is disclosed for expanding input light in two dimensions in an augmented reality display. The device comprises a waveguide (12) and three linear diffraction grat-ings H0, H1, H2. An incident beam from a projector illuminates an input grating H0 with polychromatic light, and the light is coupled into the waveguide (12). The other two gratings H1, H2 are overlaid on top of one another. Light can be diffracted by one grating H1 into a first diffracted order and towards the other grating H2 which can couple the light out of the waveguide (12) towards a viewer. In another arrangement the crossed gratings H1, H2 may be (Continued)

replaced by a photonic crystal (19) having a regular array of pillars (20) which create a number effective diffraction gratings.

13 Claims, 20 Drawing Sheets

Related U.S. Application Data

(60) Provisional application No. 62/032,577, filed on Aug. 3, 2014.

(51) Int. Cl.
*G02B 27/42* (2006.01)
*G02B 27/00* (2006.01)

(52) U.S. Cl.
CPC ..... *G02B 27/0081* (2013.01); *G02B 27/4272* (2013.01); *G02B 2027/0125* (2013.01); *G02B 2027/0174* (2013.01)

(56) References Cited

U.S. PATENT DOCUMENTS

| | | |
|---|---|---|
| 2012/0218481 A1 | 8/2012 | Popovich et al. |
| 2013/0314789 A1* | 11/2013 | Saarikko ............ G02B 27/0081 359/489.07 |
| 2013/0314793 A1 | 11/2013 | Robbins et al. |
| 2014/0043689 A1 | 2/2014 | Mason |
| 2018/0210205 A1 | 7/2018 | Grey et al. |

FOREIGN PATENT DOCUMENTS

| | | |
|---|---|---|
| WO | 2008081070 A1 | 7/2008 |
| WO | 2013033274 A1 | 3/2013 |
| WO | 2014091200 A1 | 6/2014 |

OTHER PUBLICATIONS

Grey, et al., Notice of Allowance dated Sep. 19, 2018 for U.S. Appl. No. 15/329,557.
Grey, et al., Office Action dated May 24, 2018 for U.S. Appl. No. 15/329,557.

* cited by examiner

FIG.15 A & B

EXIT PUPIL EXPANDING DIFFRACTIVE OPTICAL WAVEGUIDING DEVICE

CROSS-REFERENCE TO RELATED APPLICATIONS

This application is continuation of U.S. application Ser. No. 15/329,557, filed Jan. 26, 2017, titled EXIT PUPIL EXPANDING DIFFRACTIVE OPTICAL WAVEGUIDING DEVICE, which claims priority to and is a national stage application under 35 U.S.C. § 371 of International Application No. PCT/GB2015/052181, titled EXIT PUPIL EXPANDING DIFFRACTIVE OPTICAL WAVEGUIDING DEVICE, filed Jul. 28, 2015, which claims priority to Great Britain Application No. 1502098.5, filed Feb. 9, 2015, and claims priority to U.S. provisional application No. 62/032,577, filed Aug. 3, 2014, all of which are hereby incorporated herein by reference in their entireties.

TECHNICAL FIELD

The invention relates to an augmented reality display or a head-up display. In particular, it relates to a display in which input light is expanded in two orthogonal directions and is coupled out of a waveguide towards a viewer. This can allow physical expansion of an image in an augmented reality display.

BRIEF DESCRIPTION OF THE DRAWINGS

Embodiments of the present invention will now be described, by way of example only, with reference to the accompanying drawings in which.

DETAILED DESCRIPTION OF PREFERRED EMBODIMENTS

An augmented reality display allows a user to view their surroundings as well as projected images. In military or transportation applications the projected images can be overlaid on the real world perceived by the user. Other applications for these displays include video games and wearable devices, such as glasses.

In a normal set-up a transparent display screen is provided in front of a user so that they can continue to see the physical world. The display screen is typically a glass waveguide, and a projector is provided to one side. Light from the projector is coupled into the waveguide by a diffraction grating. The projected light is totally internally reflected within the waveguide. The light is then coupled out of the waveguide by another diffraction grating so that it can be viewed by a user. The projector can provide information and/or images that augment a user's view of the physical world.

A challenge exists in the production of wide-screen augmented reality displays because light from an input projector needs to be provided across the entire width of the display (if augmented reality is desired across the full width). One solution is to provide a single input projector and optics that can expand the field of view across the width of the display.

Figure 1:
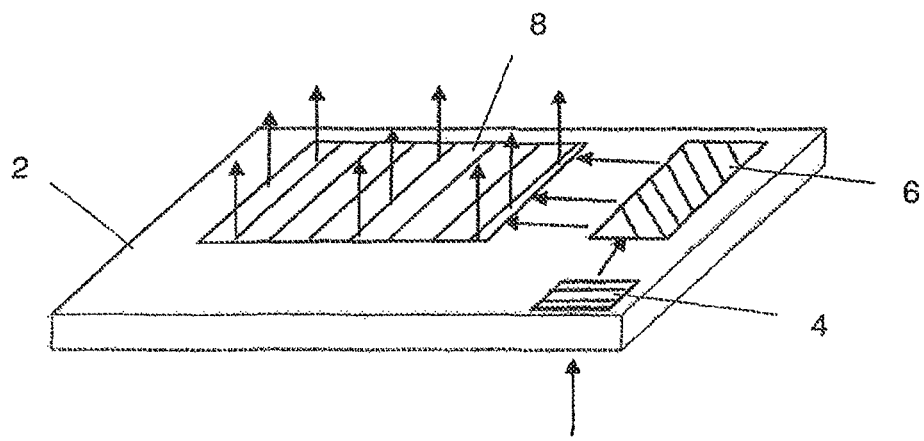
FIG. 1 is a perspective view of an optical device for expanding an input beam in two orthogonal directions.

One such device is disclosed in U.S. Pat. No. 6,580,529 which describes an arrangement similar to that shown in FIG. 1. FIG. 1 is a perspective view of a waveguide 2 which includes an input grating 4 on one of its surfaces. An input projector can provide input light in a direction that is orthogonal to the plane of the waveguide 2. The input grating 4 can diffract the input light so that the first diffraction order is coupled into the waveguide 2. The captured light can travel within the waveguide 2 by total internal reflection towards a second grating 6, the grooves of which are oriented at 45° to the incident light. At each point of interaction with the second grating 6, light can either be transmitted or diffracted. Light that is diffracted by the second grating 6 is turned through 90° and the first diffraction order extends within the waveguide 2 towards a third grating 8. Light that is initially transmitted in the second grating 6 can extend further within the grating 6 before it is diffracted towards the third grating 8. This can provide a one dimensional expansion of the incident light, along the length of the second grating 6. The grooves of the third grating 8 are oriented orthogonally to its incident light. At each point of interaction with the third grating 8, light can either be transmitted or diffracted. The transmitted light continues to travel within the waveguide 8 by total internal reflection. Light that is diffracted by the third grating 8 is coupled out of the waveguide 2 and towards a viewer. The third grating can therefore provide a one dimensional expansion of the light in a direction that is orthogonal to the third grating's grooves. In this way, the optical device in FIG. 1 can achieve a two-dimensional expansion of the input light, where a first dimension of expansion is provided by the second grating 6 and a second dimension of expansion is provided by the third grating 8.

Figure 2:
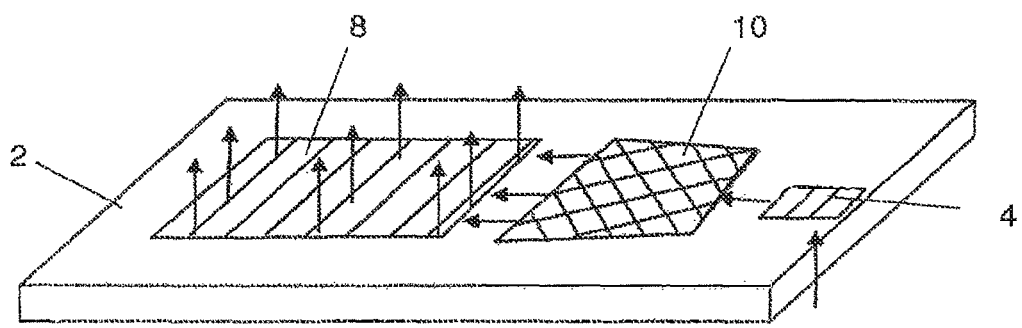
FIG. 2 is a perspective view of another optical device for expanding an input beam in two orthogonal directions.

An alternative system is disclosed in WO 2008/081070, which describes a device similar to that shown in FIG. 2. FIG. 2 is a perspective view of a waveguide 2 having a first grating 4 and a third grating 8, which are similar to those in FIG. 1. A crossed grating 10 is also provided between the first and third gratings 4, 8. The crossed grating 10 includes two overlapping gratings with grooves at 90° to one another. When light from the input grating 4 encounters the crossed grating 10 it is simultaneously diffracted in opposite directions which are mutually orthogonal to the input light beam, but are within the plane of the waveguide 2. The light is then diffracted again in the crossed grating so that it can extend towards the third grating 8. In this way, the crossed grating 10 can provide expansion of the input light in two opposite directions.

Light output by the crossed grating 10 travels towards the third grating 8. When the input light encounters the third grating 8 it is either transmitted or diffracted. The transmitted portion of the beam extends within the third waveguide 8, and the diffracted portion of the beam is coupled out of the waveguide 2 towards the viewer. Any transmitted portions of the beam can then be diffracted out of the waveguide 2 by later grooves of the grating 8. Thus, a first dimension of expansion is provided by the crossed grating 10 and a second dimension of expansion is provided by the third grating 8. In order for this to be effective the grating periods are selected specifically to prevent any outcoupling of light by the crossed grating 10. Thus, the only outcoupling of light is by the third grating 8.

A problem in the arrangements of FIGS. 1 and 2 relates to the space required in the waveguide to provide three separate regions with diffraction gratings. These large optical systems may not be appropriate for all devices. A further problem is that a large number of diffractive interactions are required. Each diffractive interaction causes scattering and therefore reduces contrast in the resulting image. Yet another problem is that these devices are not necessarily appropriate for colour displays. It is an object of the present invention to overcome some of these shortcomings.

According to an aspect of the present invention there is provided an optical device for expanding input light in two dimensions in an augmented reality display, comprising: a waveguide; an input diffractive optical element configured to couple input light into the waveguide; and two diffractive optical elements at least partially overlaid on one another in or on the waveguide, wherein at least one of the two diffractive optical elements can act as an output diffractive optical element which couples light out of the waveguide towards a viewer.

In this way the optical device can achieve two-dimensional expansion of an input light source while simultaneously coupling light out of the waveguide so that it can be viewed by a user. This can allow more efficient use of space in an optical device because two-dimensional expansion can be provided within the same area of the waveguide as output coupling. This can advantageously reduce the cost of manufacture. The device can also offer improved optical characteristics. For example, the device may offer improved background contrast because two-dimensional expansion can be achieved with a reduced number of diffractive interactions. The two diffractive optical elements may be partially or entirely overlaid on one another in or on the waveguide.

One advantage of the optical device is that simultaneous two-dimensional beam expansion and outcoupling can be provided with only two areas of the waveguide devoted to diffractive optical elements (one for the input diffractive optical element and one for the overlaid diffractive optical elements). This can reduce the overall size of the device. Additionally, similar optical performance can be achieved with reduced tolerances with regards substrate flatness and wedge, which means that the device can be produced for lower cost. Alternatively, better optical performance can be achieved without increasing tolerances in manufacture.

In the overlaid diffractive optical elements, one of the elements preferably directs light received from the input diffractive optical element towards the other element in the overlaid pair. The other diffractive optical element can then couple light out of the waveguide and towards a viewer. Preferably this is a symmetrical arrangement so that each of the overlaid diffractive optical element can direct received light towards the other for outward coupling.

Each diffractive optical element preferably comprises grooves and a grating vector in the plane of the grooves. The grating vector may be defined with a direction that is normal to the grooves and a magnitude which is inversely related to the pitch of the grooves. The input and output diffractive optical elements respectively may have grating vectors with a substantially equal magnitude.

By providing input and output grating vectors with the same magnitude it is possible to obtain an exit beam with the same angular properties as the input beam. Thus, the exit beam can be provided at the same angle as the input beam. This can be achieved over all operating wavelengths, meaning that the device can operate effectively in colour (i.e. over a range of wavelengths).

A combination of the respective grating vectors of the input diffractive optical element and the two diffractive optical elements may be a resultant vector with substantially zero magnitude. This combined property of the gratings means that output light can be provided with substantially no angular or chromatic shift, which can facilitate use of the device in a colour augmented reality display. In some arrangements the resultant vector may have a small magnitude. In general these embodiments are more appropriate for monochromatic light since this arrangement would normally produce chromatic dispersion, which is undesirable in a colour display.

The grooves of the diffractive optical element may be linear, and may be formed by etching in a surface of the waveguide. Alternatively the grooves may be formed by variations in refractive index, such as may be found in a volume type photopolymer. These may be smoothly varying changes in refractive index or step-changes.

The grating vectors of the two diffractive optical elements may subtend equal and opposite angles to the grating vector of the input diffractive optical element. In this way the overlaid diffractive optical elements can be crossed relative to one another, and can be symmetrically disposed relative to the input diffractive optical element. Light from the input diffractive optical element can therefore be simultaneously diffracted in divergent directions by the two diffractive optical elements. By providing diffractive optical elements with equal and opposite grating vectors the two dimensional expansion can be symmetrical, and the angular shift created by both gratings can be equal.

The grating vectors of the input diffractive optical element and the two diffractive optical elements may have substantially the same magnitude. Since a combination of these three vectors has substantially zero magnitude, the vectors may be combined to create an equilateral triangle, such that the grating vectors are at approximately 60° relative to one another. This arrangement can allow even diffraction by the crossed diffractive optical elements, in divergent directions. Identical subsequent diffractions can then occur due to the crossed diffractive optical elements in order to couple light out of the waveguide. In this way, each of the two diffractive optical elements can act as an output grating, following diffraction of light by the other overlaid diffractive optical element. This can allow light to be coupled out of the waveguide in the same orientation as it was input. Advantageously, all wavelengths can experience the same result to facilitate a colour display.

Preferably the input grating is spaced apart from the two diffractive optical elements. The input grating can couple light into the waveguide and it can travel through the waveguide under total internal reflection to the other two diffractive optical elements.

Preferably a projector is provided to project light towards the input diffractive optical element. The projector may be polychromatic and provided in an orientation that is transverse to the plane of the waveguide.

The projected light may be provided at a first angle relative to the input diffractive optical element and light coupled out of the waveguide by the output diffractive optical element may be also provided at the first angle. Thus, output light can be provided without any angular shift.

The two overlaid diffractive optical elements may be provided in or on the waveguide in different planes. In this way, the overlaid diffractive optical elements can be physically separated from one another. Such an arrangement can be easily manufactured and can produce desirable results.

The diffractive optical elements may be provided on opposing surfaces of the waveguide. They may be provided on internal or external surfaces of the waveguide, as required. Alternatively the two diffractive optical elements may be provided in substantially the same plane in the waveguide. This may be achieved by using a photonic crystal. The diffractive optical elements may be provided by variations in the surface height and/or refractive index in the material of the crystal.

According to another aspect of the invention there is provided a diffractive optical device comprising: a light transmissive substrate; a first diffractive optical element carried by the substrate; a second diffractive optical element carried by the substrate; wherein the light transmissive substrate has two substantially parallel surfaces in two dimensions; the first diffractive optical element couples optical rays from a light source and confines them within the substrate by total internal reflection; the second diffractive optical substrate diffracts the optical rays into a number of orders in three dimensions, so of these said orders are diffracted in different directions (in the two-dimensions containing the major surfaces of the substrate) while still under total internal reflections, while at least one of the said orders couples out of the waveguide.

According to another aspect of the invention there is provided a diffractive optical device comprising: a light transmissive substrate; a diffractive optical element carried by said substrate; wherein the light transmissive substrate has two substantially parallel surfaces in two dimensions; the said single diffractive substrate couples optical rays from a light source and confines them inside said substrate by total internal reflection and the said single diffractive optical element also diffracts the said rays into a number of orders in three dimensions; some of the said orders are diffracted in different directions (in the two dimensions containing the major surfaces of the substrate) while still under total internal reflection, resulting in two dimensional replication of said rays, while at least one of the said orders couples out of the waveguide.

Figure 3:
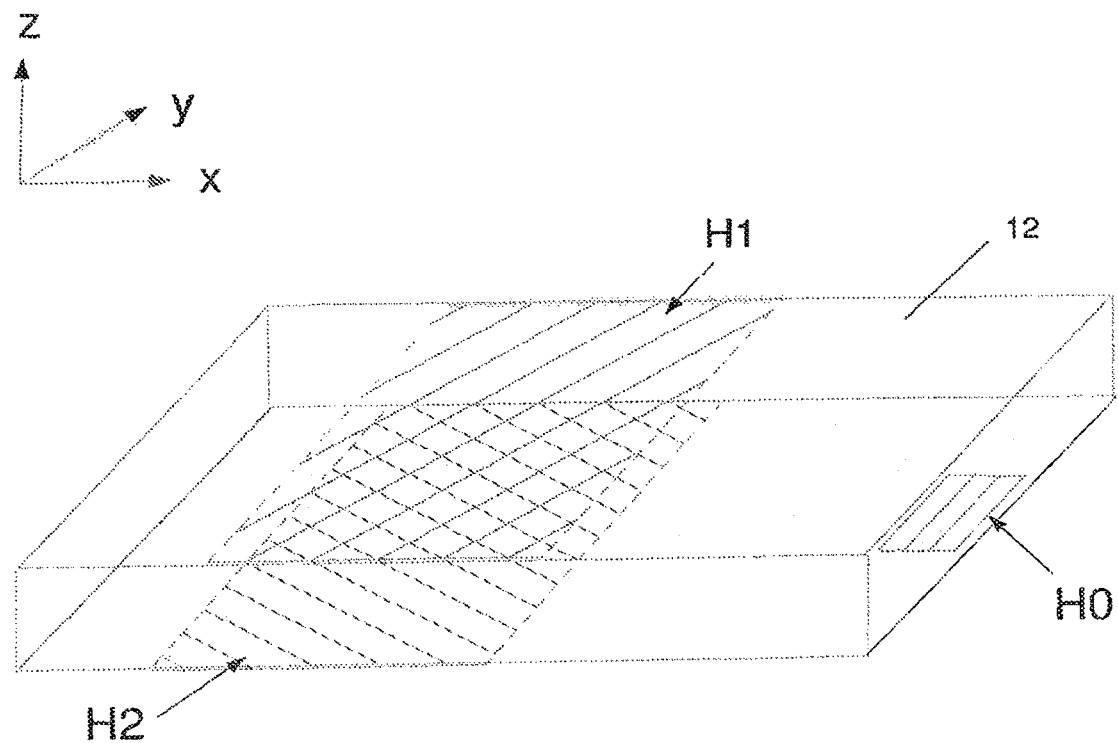
FIG. 3 is a perspective view of an optical device in an embodiment of the present invention.
Figure 4:
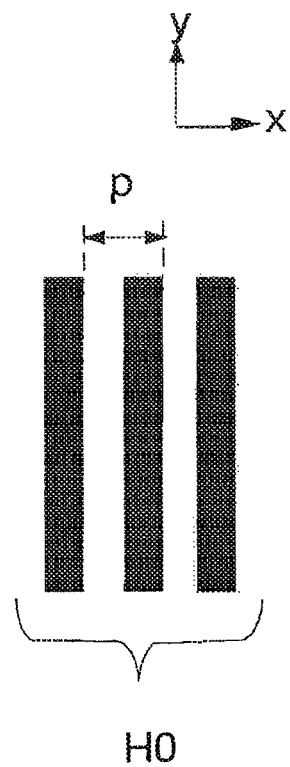
FIG. 4 is a top view of the grooves of one of the diffraction gratings in the optical device of FIG. 3.
Figure 5:
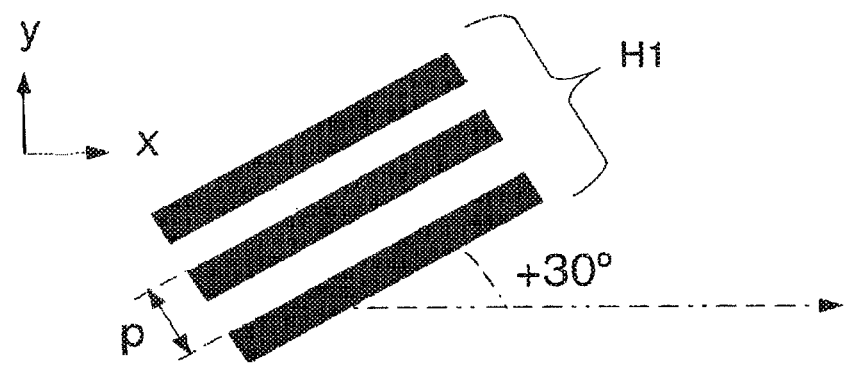
FIG. 5 is a top view of the grooves of another diffraction grating in the optical device of FIG. 3.
Figure 6:
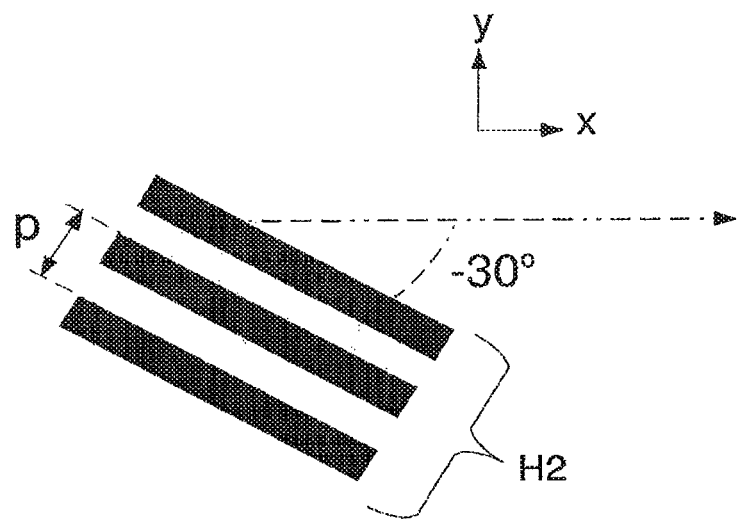
FIG. 6 is a top view of the grooves of yet another diffraction grating in the optical device of FIG. 3.

FIG. 3 is a perspective view of a waveguide 12 including three linear gratings H0, H1, H2. The grooves of input grating H0 lie in the x-y plane on a first surface of the 15 waveguide 12, are oriented parallel to the y-axis and have a grating pitch p, as shown in FIG. 4. The linear grating H1 is laterally separated from the input grating H0 in the x-y plane and it lies on a second surface of the waveguide 12. The grooves of grating H1 lie in the x-y plane, are oriented at 30° to the x-axis, and have a grating pitch p, as shown in FIG. 5. The linear grating H2 is superimposed on H1 in the x-y plane and lies on the first surface of the waveguide 12, opposite to the grating H2. The crossed gratings H1, H2 are therefore separated by the thickness of the waveguide 12 in the z-axis. The grooves of grating H2 lie in the x-y plane, are oriented at −30° to the x-axis, and have a grating pitch p, as shown in FIG. 6.

Figure 7:
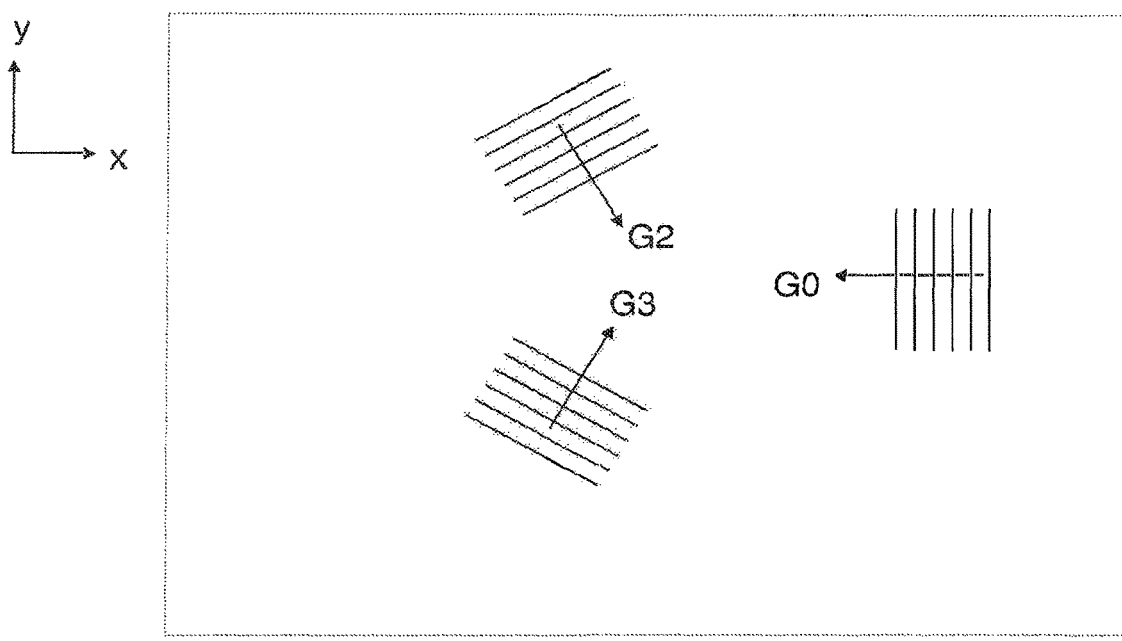
FIG. 7 is a schematic view of the optical device in FIG. 3 showing the grating vectors.
Figure 9:
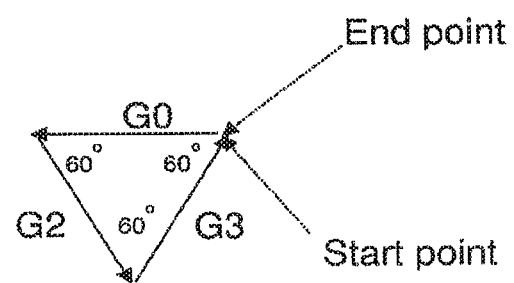
FIG. 9 shows a combination of the grating vectors for the optical device shown in FIG. 3.

A grating vector can be defined for each of the gratings H0, H1, H2. The grating vector lies in the plane of the grating's grooves and extends in a direction which is at right angles to the direction of grooves. The magnitude of the vector is given by the expression, G=2π/d where d is the pitch of the grating (i.e., the distance between adjacent grooves). FIG. 7 is a plan view of the waveguide 12 showing the grating vectors G0, G2, G3, corresponding to gratings H0, H1 and H2 respectively. Although they are depicted separately, it is clear that the vectors G2 and G3 are actually overlaid on one another. All of the vectors G0/G2/G3 have an equal magnitude and are oriented at 60° with respect to one another. As shown in FIG. 9, the vectors G0, G2, G3 form an equilateral triangle when they are combined such that they produce no resultant vector, or a resultant vector having a small magnitude.

Figure 8:
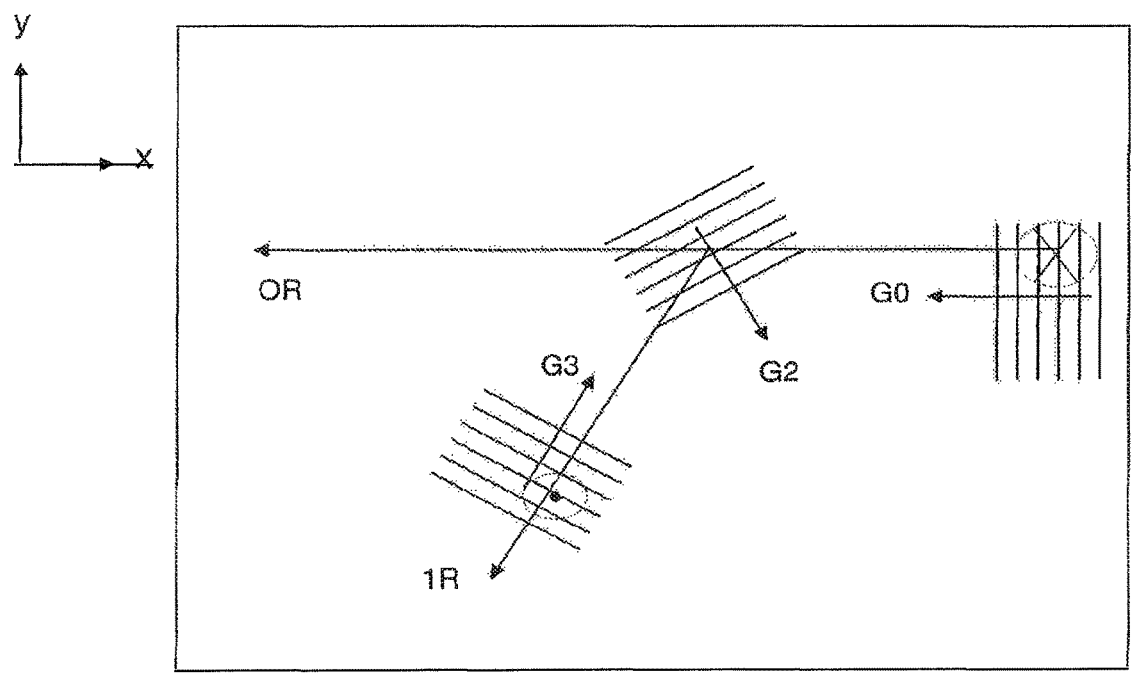
FIG. 8 is an example of some optical paths that may be taken through the optical device shown in FIG. 3.

FIG. 8 is an example of a ray diagram showing an optical path that may be taken through the waveguide 12. In this arrangement an incident beam from a projector illuminates the input grating H0 with polychromatic light. The incident beam is provided from below the waveguide 12 and extends in a direction that is orthogonal to the plane of the waveguide 12. The input grating H0 diffracts the incident beam and the first diffractive order is coupled into the waveguide 12. The diffracted light then travels within the waveguide 12 by total internal reflection. The light then encounters the crossed grating 10 and it interacts with the crossed gratings H1, H2 simultaneously.

The grating H1 (with vector G2) diffracts light into a zero order 0R and a first diffracted order 1R. The first diffracted order 1R is at −120° to the x-axis and is still under total internal reflection in the waveguide 12. The first diffracted order 1R then encounters H2 (with vector G3), which is the other part of the crossed grating 10. At this point H2 also diffracts light into a zero order and a first diffracted order. The zero order continues to travel within the waveguide 12, and the first diffracted order is coupled out of the waveguide 12 along the z-axis towards a viewer. The angle at which the light is output from the waveguide 12 in this example is the same as the angle at which light is incident on the waveguide 12 from the projector.

Figure 10:
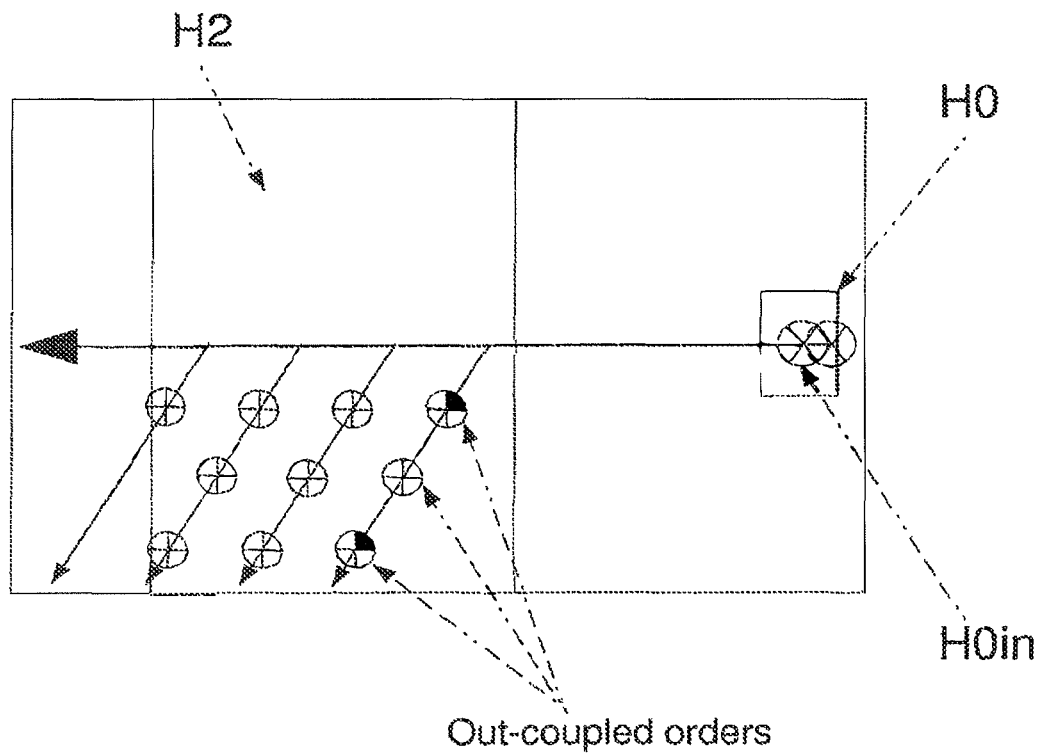
FIG. 10 is a top view of a waveguide showing another example of optical paths that may be taken through the optical device shown in FIG. 3.

FIG. 10 is another view of the ray diagram shown in FIG. 8. It is clear from FIG. 10 that the incident light on the crossed grating can be diffracted at a plurality of different positions within the waveguide by the grating H1. This is because at each point of interaction the light can either be diffracted into the zero order or the first diffracted order. In this way, the input beam can be expanded in a first direction.

Light that is diffracted into the first order by the grating H1 then encounters grating H2 where it is either diffracted into the zero order or the first order. This can allow the input light to be expanded in a second direction, which is orthogonal to the grooves of H2. In this way, outcoupled orders can be provided across a two-dimensional area by the grating H2. This can allow two-dimensional expansion and outcoupling of light to be provided together over a small physical area.

Figure 11:
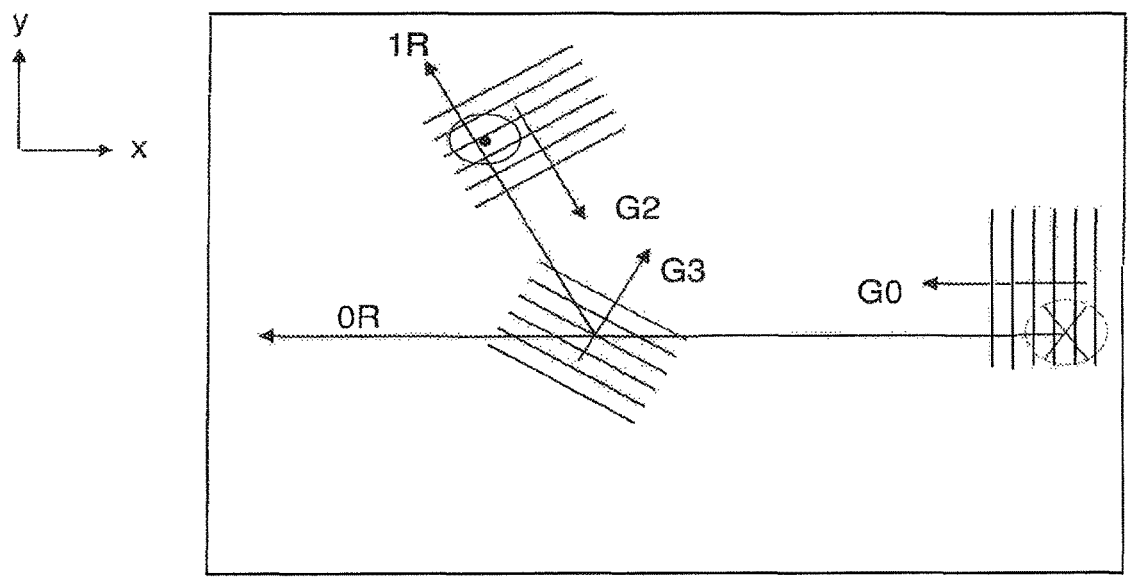
FIG. 11 is another example of some optical paths that may be taken through the optical device shown in FIG. 3.

FIG. 11 is another example of a ray diagram showing an optical path that may be taken through the waveguide 12. In this arrangement, light from the input grating H0 encounters the crossed grating 10 and it interacts with the grating H2 (with vector G3). The grating H2 diffracts light into the zero order 0R and a first diffracted order 1R. The first diffracted order 1R is at +120° to the x-axis and is still under total internal reflection in the waveguide 12. The first diffracted order 1R then encounters H1, which is the other part of the crossed grating 10. At this point H1 couples the light upwards out of the waveguide 12 and towards a viewer. The angle at which the light is output from the waveguide 12 in this example is the same as the angle at which light is incident on the waveguide 12.

Figure 12:
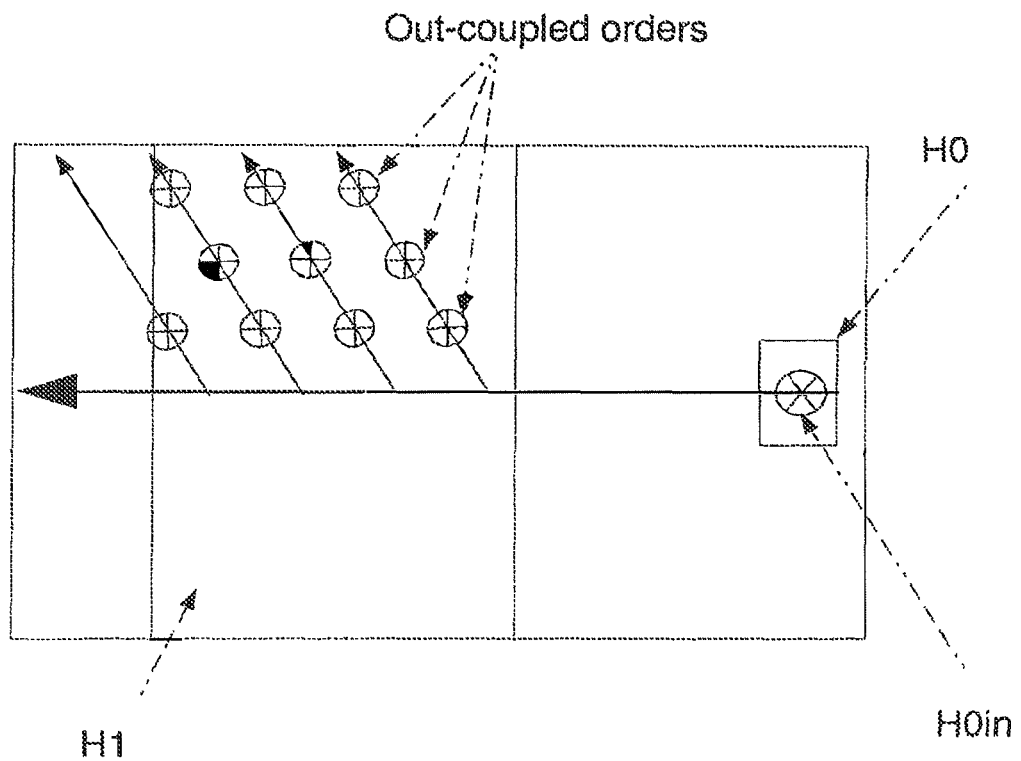
FIG. 12 is a top view of a waveguide showing yet another example of optical paths that may be taken through the optical device shown in FIG. 3.

FIG. 12 is another view of the ray diagram shown in FIG. 11. It can be appreciated that this arrangement of gratings can expand the input beam in order to fill a two-dimensional display. Of course, light follows the path shown in FIG. 10 simultaneously with the path shown in FIG. 12, which provides even expansion of the input beam over a two-dimensional area.

In this example, the light has encountered three diffraction gratings with vectors G0, G2 and G3. The sequence of diffraction can either be G0/G2/G3 or G0/G3/G2. Each of these vectors has the same magnitude. As shown in FIG. 9, if the vectors are added to one another then a vector diagram is obtained in the shape of an equilateral triangle, having the same start and end position. The physics of diffraction gratings dictates that this arrangement provides an exit beam with the same angular and chromatic properties as the input beam.

Figure 13:
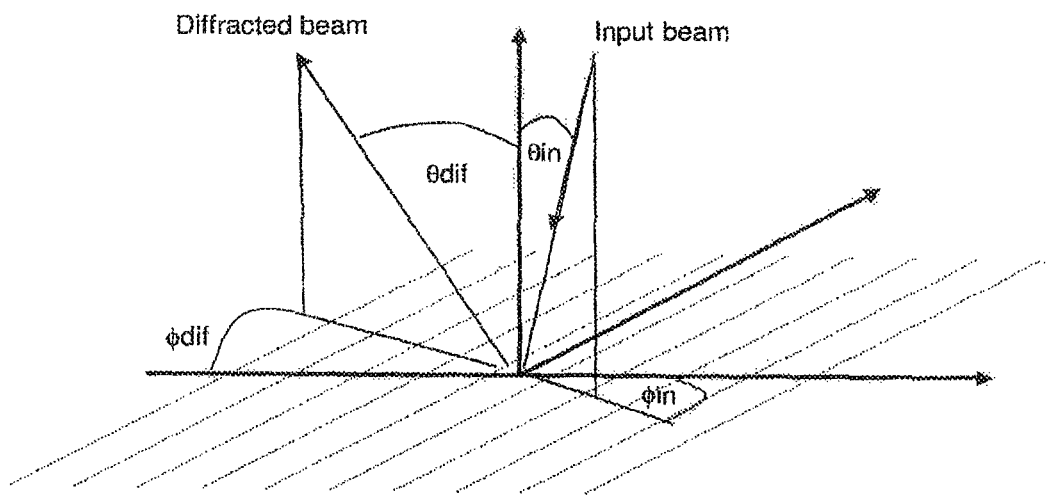
FIG. 13 is a diagram showing the light received at and diffracted by an input grating.

FIG. 13 is a diagram showing light being diffracted at the input grating H0. In this situation an input beam is provided with angle of incidence $\theta_{in}$ relative to the z-axis and angle of incidence $\varphi_{in}$ relative to the x-axis. This input beam is then diffracted by the input grating H0 and is captured by the waveguide 12.

Figure 14:
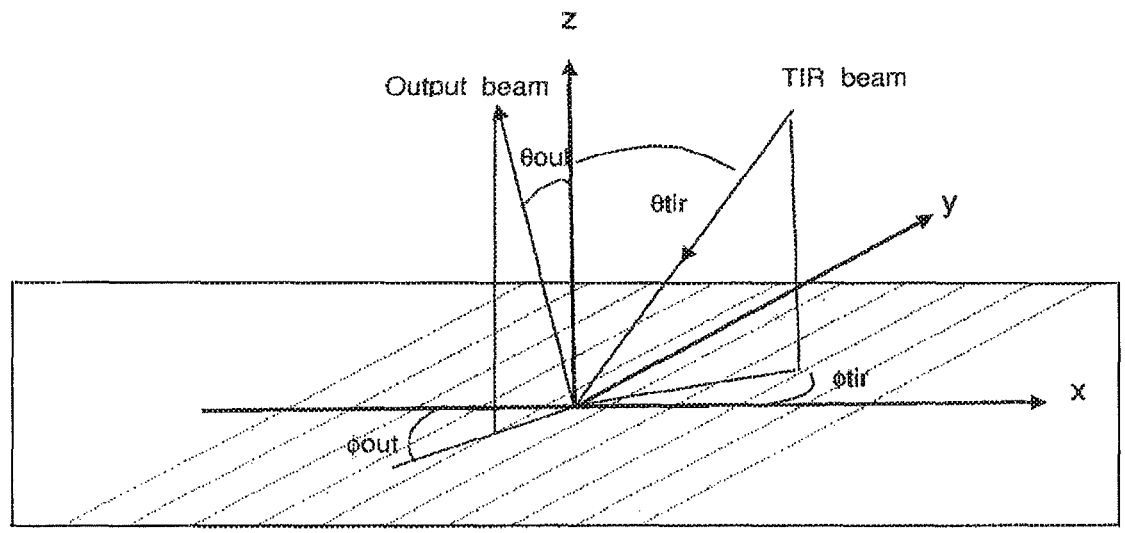
FIG. 14 is a diagram showing the light received at and diffracted by an output grating.

FIG. 14 is a diagram showing light being diffracted at the output grating. In this example the output grating could either be H1 or H2, depending on the path taken by the light through the waveguide 12. As can be seen, light is received at the output grating from total internal reflection within the waveguide 12, and it is output an angle of incidence $\theta_{out}$ relative to the z-axis and $\varphi_{out}$ relative to the x-axis, where $\theta_{out}=\theta_{in}$ and $\varphi_{in}=\varphi_{out}$. These relationships apply independently of wavelength, which means that there is no angular or chromatic shift in a colour display.

Figure 15A:
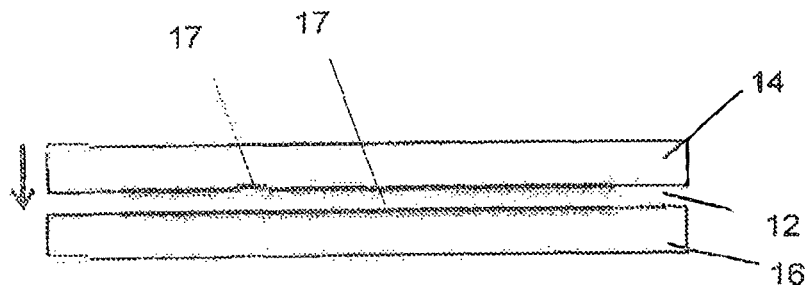
FIGS. 15A and B are side views of a waveguide in alternative arrangements showing internal and external gratings respectively.
Figure 15B:
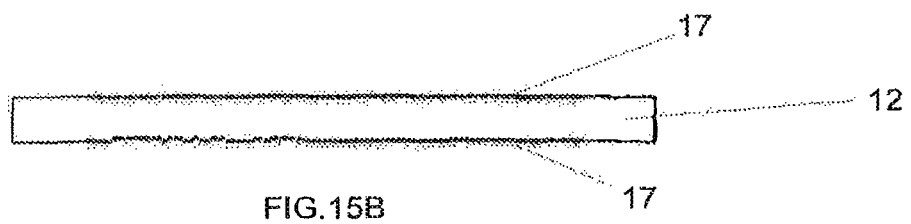

FIG. 15A is a side view of the waveguide 12, sandwiched between two glass plates 14, 16. In this arrangement, gratings 17 are provided on surfaces of the glass plates 14, 16 and the waveguide 12 is assembled to these plates 14, 16 with a thin layer of optical cement. Thus, the gratings 17 are provided on internal surfaces of the glass plates 14, 16. FIG. 15B is a side view of the waveguide 12 in an alternative configuration in which gratings 17 are provided directly on its surfaces. In this way the gratings 17 can be provided on external surfaces of the waveguide 12.

Figure 16:
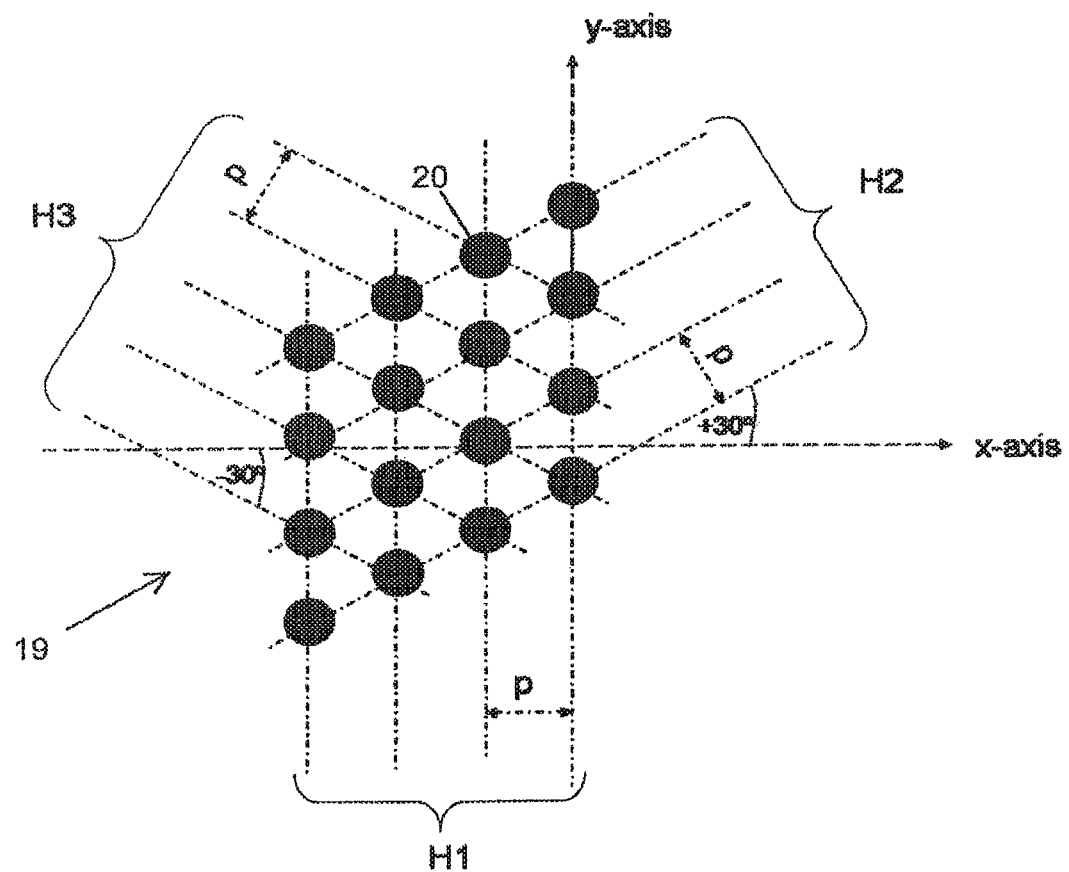
FIG. 16 is a schematic view of a photonic crystal with a triangular lattice structure for use in an embodiment of the invention.
Figure 17:
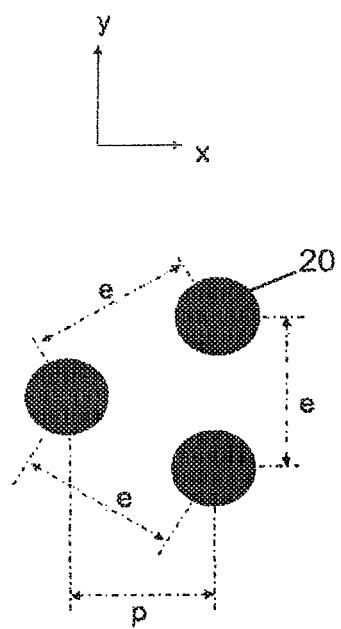
FIG. 17 is a schematic view showing the structure of the triangular lattice of the photonic crystal shown in FIG. 16.

In another embodiment the crossed grating 10 may be replaced by a photonic crystal. A photonic crystal is a material in which a variable refractive index produces a regular pattern. In this example the photonic crystal is in the form of a triangular lattice. A two dimensional photonic crystal has periodic nano-structures in orthogonal directions. In this example the photonic crystal is in the form of an equilateral triangular lattice. FIG. 16 is a top view of a photonic crystal 19 having circular 20 pillars 20 that have an increased refractive index relative to the waveguide 12. The pillars 20 are arranged in a regular pattern and they are all provided in the same x-y plane. FIG. 17 shows three of the circular pillars 20. The pillars are separated by a distance e, which corresponds to a distance p along the x-axis or the y-axis.

The regular arrangement of pillars creates a number of effective diffraction gratings or diffractive optical elements. In particular it is possible to define a grating H1 with pillars 20 aligned along the y-axis with adjacent rows of pillars 20 separated by a distance p. Grating H2 is arranged with rows of pillars 20 at an angle of +30° to the x-axis, with adjacent rows separated by a distance p. Finally, grating H3 is arranged with rows of pillars 20 at an angle of −30° to the x-axis, with adjacent rows separated by a distance p. It is noted that gratings H1 and H2 have the same properties as the corresponding gratings in the crossed grating embodiment shown in FIG. 3.

Figure 18:
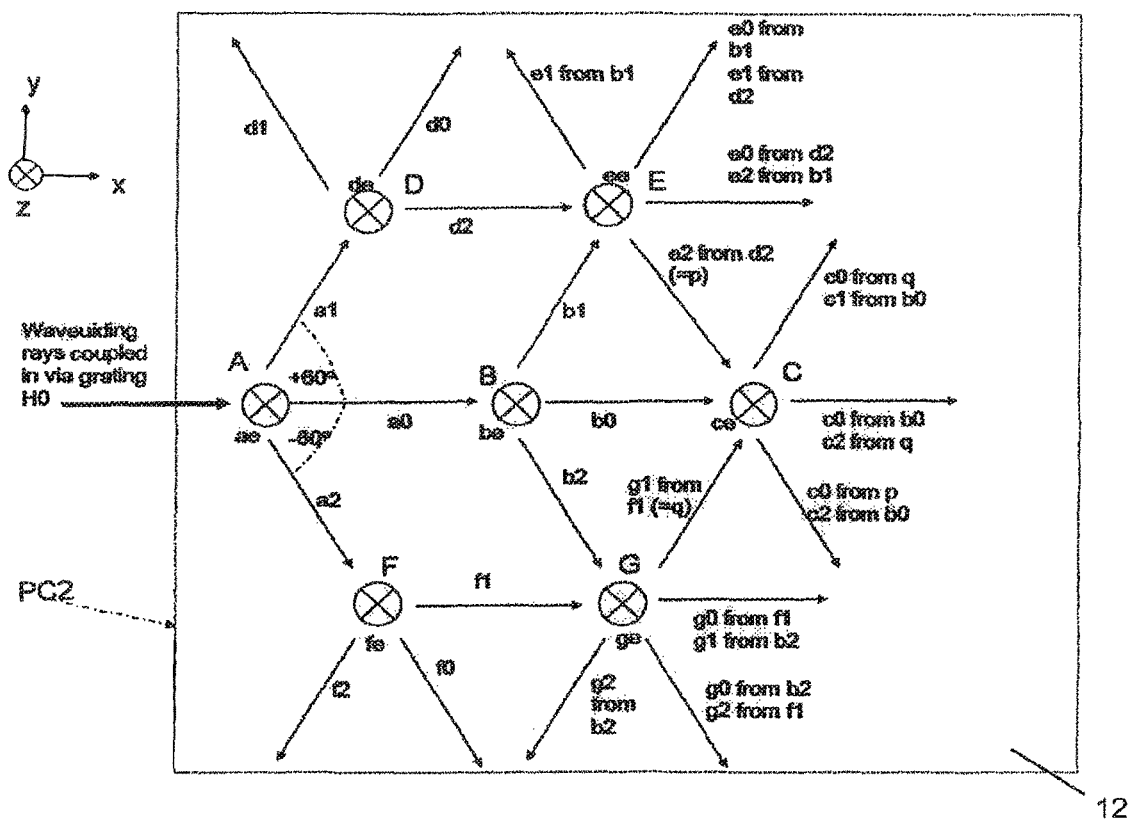
FIG. 18 is a diagram showing optical paths that may be taken through the photonic crystal shown in FIG. 16.

When light from the input grating H0 is incident on the photonic crystal 19 it undergoes multiple simultaneous diffractions by the various diffractive optical elements. FIG. 18 is a diagram showing the optical paths that may be taken through the photonic crystal. Light is received in the photonic crystal at point A where it can simultaneously undergo diffraction into four orders. First, light is diffracted into a zero order a0, which is a continuation of the propagation of the incident light. The zero order can continue to make further interactions with the photonic crystal at points B and C. Second, light is diffracted into a first diffraction order ae by grating H1. This light beam ae is coupled out of the waveguide 12 in a positive direction along the z-axis, towards a viewer. The groove orientation and pitch of grating H1 is the same as grating H0. Thus, the angular and chromatic dispersion effects of diffraction are cancelled due to the conjugate effects of the gratings H0 and H1. Thus, the light beam ae is provided with the same angular and chromatic properties as the light that is incident on H0 from the projector. Third, light is diffracted into a first diffracted order a1 by the H2 grating component. The a1 beam is diffracted at +60° to the x-axis, and this light beam goes on to make further interactions with the photonic crystal at point D. The a1 diffracted beam is effectively the same as the light diffracted by the crossed grating H2 as explained with reference to FIG. 12. Fourth, light is diffracted into a first diffracted order a2 by the H1 grating component. This light beam can interact with the grating H2 at point F. At each point in the photonic crystal light can make these four separate diffractive interactions. Thus, light can be coupled out of the waveguide at each point, and yet light can continue to expand within the waveguide 12 in two dimensions. The symmetry of the photonic crystal means that every exit beam has the same angular and chromatic properties as the input beam, which means that a polychromatic (as well as a monochromatic) light source may be used as the input beam with this photonic crystal arrangement.

The number of optical paths described has been limited in the interest of brevity. However, it will be clear to a skilled reader that a very large number of optical paths would be possible, all of which would produce outcoupled orders which allow creation of an augmented reality image. Further, the circular structure shape used in this example of the photonic crystal implementation is for illustrative purposes only: practitioners skilled in the art will understand that a large number of suitable structure shapes exist.

The photonic crystal can allow simultaneous and rapid expansion of light in two dimensions so that the input light can fill a two-dimensional display screen. This can allow an ultra-compact display because the waveguide size can be kept to a minimum due to the two-dimensional beam expansion.

Figure 19:
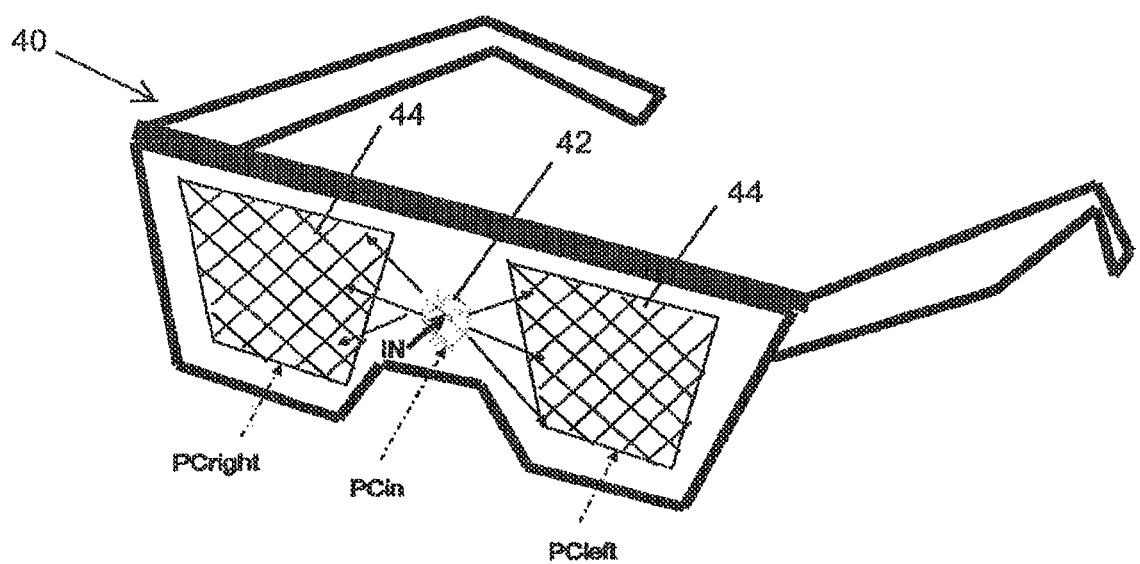
FIG. 19 is a perspective view of a pair of glasses in an embodiment of the invention.

FIG. 19 shows a pair of glasses 40. The eye pieces 44 are waveguides including crossed gratings or photonic crystals in front of a user's eyes. In this example the input grating 42 is provided in the bridge of the glasses 40. Thus, light can be projected onto the input grating and can be directed towards the eye pieces 44. The crossed gratings or photonic crystals within the eye pieces and expand the light in two dimensions and can couple it out of the waveguide towards the user's eyes.

Figure 20:
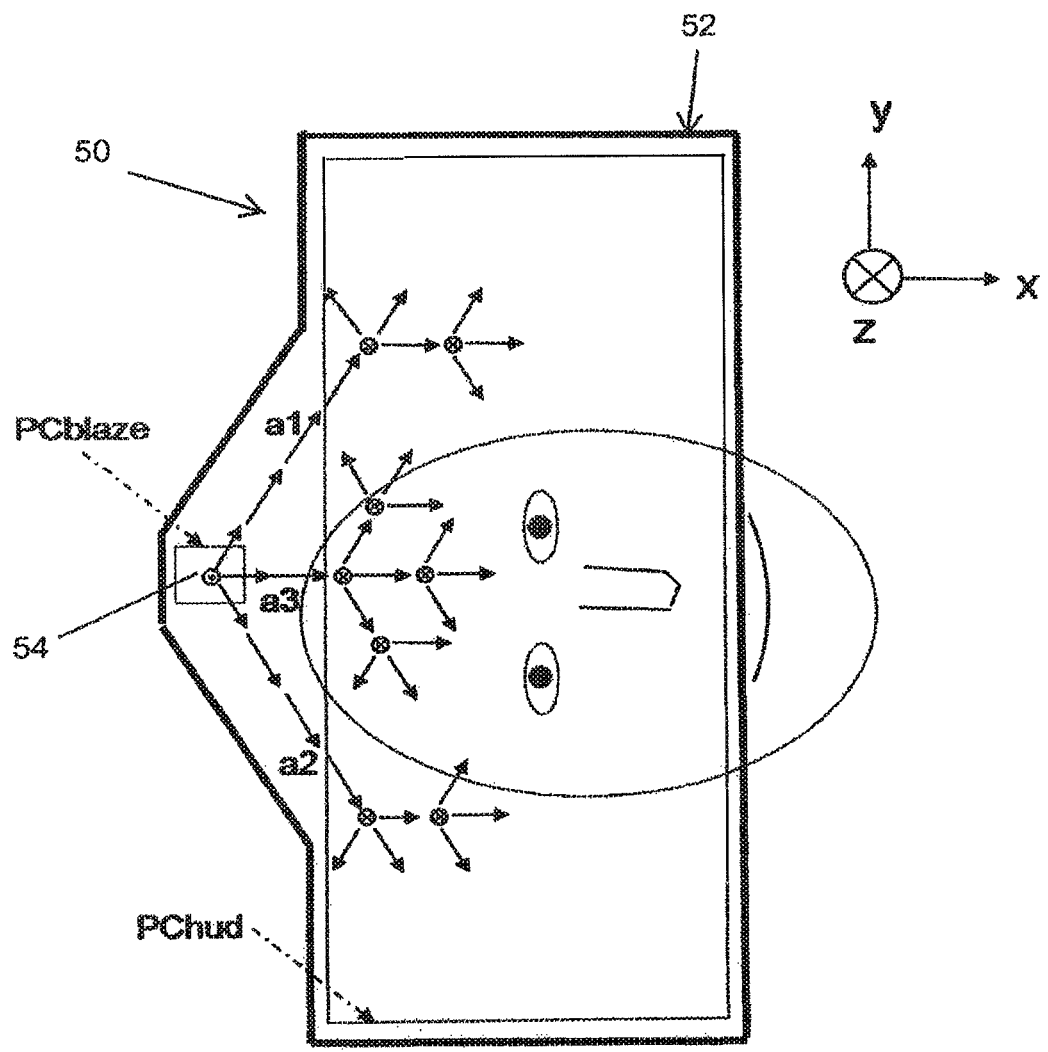
FIG. 20 is a perspective view of a head-up display in an embodiment of the invention.

FIG. 20 shows another example where a head-up display 50 is provided in front of a user. The crossed gratings or photonic crystal are provided in a waveguide 52 in the head-up display. An input grating 54 is provided at the top of the display and the crossed gratings or photonic crystal in the waveguide 52 allow rapid two-dimensional expansion of the image and outward coupling of the light towards a viewer.

The invention claimed is:

1. An optical device for expanding input light in two dimensions in an augmented reality display, comprising:
   a waveguide;
   an input diffractive optical element configured to couple input light into the waveguide; and
   two diffractive optical elements that are crossed relative to one another so that their grating vectors extend in different directions and that are entirely overlaid on one another in or on the waveguide, wherein each of the two diffractive optical elements is configured to receive light from the input diffractive optical element and couple it towards the other diffractive optical element which can then act as an output diffractive optical element providing outcoupled orders towards a viewer, and wherein the two diffractive optical elements are configured to diffract light received from the input diffractive optical element in different respective directions, since their grating vectors extend in the different directions.

2. The optical device of claim 1 wherein each diffractive optical element comprises grooves and a grating vector in the plane of the grooves, having a direction that is normal to the grooves and a magnitude which is inversely related to the pitch of the grooves, wherein the input and output diffractive optical elements respectively have grating vectors with a substantially equal magnitude.

3. The optical device of claim 2 wherein a combination of the respective grating vectors of the input diffractive optical element and the two diffractive optical elements is a resultant vector with substantially zero magnitude.

4. The optical device of claim 3 wherein the grating vectors of the two diffractive optical elements subtend equal and opposite angles to the grating vector of the input diffractive optical element.

5. The optical device of claim 2 wherein the grating vectors of the input diffractive optical element and the two diffractive optical elements have substantially the same magnitude.

6. The optical device of claim 5 wherein the grating vectors of the input diffractive optical element and the two diffractive optical elements can be combined in a triangle that is substantially equilateral.

7. The optical device of claim 1 wherein the input grating is spaced apart from the two diffractive optical elements.

8. The optical device of claim 1 comprising a projector configured to project light towards the input diffractive optical element.

9. The optical device of claim 8 wherein the projected light is provided at a first angle relative to the input diffractive optical element and wherein light coupled out of the waveguide by the output diffractive optical element is also provided at the first angle.

10. The optical device of claim 1 wherein the two overlaid diffractive optical elements are provided in or on the waveguide in different planes.

11. The optical device of claim 10 wherein the diffractive optical elements are provided on opposing surfaces of the waveguide.

12. The optical device of claim 1 wherein at least two diffractive optical elements are provided in substantially the same plane in the waveguide.

13. The optical device of claim 12 wherein at least two diffractive optical elements are provided in a photonic crystal.

* * * * *